(12) United States Patent
Serkh

(10) Patent No.: US 7,798,928 B2
(45) Date of Patent: Sep. 21, 2010

(54) DUAL RATIO BELT DRIVE SYSTEM

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 1514 days.

(21) Appl. No.: 10/807,937

(22) Filed: Mar. 24, 2004

(65) Prior Publication Data

US 2005/0215366 A1 Sep. 29, 2005

(51) Int. Cl.
*F16H 59/00* (2006.01)
*F16H 9/00* (2006.01)

(52) U.S. Cl. ............................ 474/70; 474/88; 474/152

(58) Field of Classification Search ................. 474/30, 474/74, 94, 199, 70, 88, 152; 464/73, 81, 464/85, 89; 192/84.961, 84.1, 56.5, 41 R, 192/45, 48.2–48.4, 48.8–48.9, 48.92, 55.3, 192/209, 45.1, 46, 69.1, 108; 123/41.11; 384/417
See application file for complete search history.

(56) References Cited

U.S. PATENT DOCUMENTS

| | | | | | |
|---|---|---|---|---|---|
| 2,911,961 | A | * | 11/1959 | McRae | 123/41.11 |
| 3,019,874 | A | * | 2/1962 | Heckethorn | 192/104 R |
| 3,444,748 | A | * | 5/1969 | Sutaruk | 192/45 |
| 3,747,731 | A | | 7/1973 | Smirl | 192/104 |
| 3,842,378 | A | * | 10/1974 | Pierce | 192/84.31 |
| 4,020,711 | A | | 5/1977 | Woollard | 74/230.17 |
| 4,072,211 | A | * | 2/1978 | Kitajima et al. | 192/48.92 |
| 4,080,843 | A | | 3/1978 | Underwood | 74/336 |
| 4,160,498 | A | * | 7/1979 | Newton et al. | 192/84.961 |
| 4,265,135 | A | | 5/1981 | Smirl | 74/336 |
| 4,296,717 | A | | 10/1981 | Schlagmuller | 123/195 |
| 4,455,812 | A | * | 6/1984 | James | 56/11.5 |
| 4,488,627 | A | * | 12/1984 | Streich et al. | 192/48.2 |
| 4,502,345 | A | | 3/1985 | Butterfield | 74/336 |
| 4,526,257 | A | * | 7/1985 | Mueller | 192/48.2 |
| 4,564,092 | A | * | 1/1986 | Pierce | 192/48.2 |
| 4,567,975 | A | * | 2/1986 | Roll | 192/84.961 |
| 4,650,052 | A | * | 3/1987 | Okada | 192/84.1 |
| 4,667,537 | A | | 5/1987 | Sivalingham | 74/752 |
| 4,674,612 | A | * | 6/1987 | Ogura | 192/48.92 |
| 4,706,520 | A | | 11/1987 | Sivalingam | 74/781 |
| 4,800,780 | A | * | 1/1989 | Sivalingam | 192/48.4 |
| 4,846,327 | A | * | 7/1989 | Mayer | 192/84.961 |

(Continued)

FOREIGN PATENT DOCUMENTS

FR 2 486 610 1/1982

(Continued)

*Primary Examiner*—Marcus Charles
(74) *Attorney, Agent, or Firm*—J. A. Thurnau, Esq.; P. N. Dunlap, Esq.

(57) ABSTRACT

A dual ratio belt drive system comprising a clutch unit mounted directly to a driver rotating shaft, a one-way clutch mounted directly to the driver rotating shaft, a plurality of rotating accessories rotatably connected to the clutch unit and rotatably connected to the driver rotating shaft through the one-way clutch such that the accessories are driven by the clutch unit at a first speed ratio and driven directly by the driver rotating shaft through said one-way clutch at a second speed ratio, with the clutch unit operating at a predetermined value of an engine operating condition thereby defining the transition between the first and second speed ratios, and the clutch unit being engaged at engine start.

10 Claims, 9 Drawing Sheets

U.S. PATENT DOCUMENTS

| | | | |
|---|---|---|---|
| 4,846,768 A | 7/1989 | Kitami et al. | 474/86 |
| 4,854,192 A | 8/1989 | Churchill et al. | 74/752 |
| 4,854,921 A | 8/1989 | Kumm | 474/70 |
| 4,878,401 A | 11/1989 | Chung | 74/781 |
| 4,969,857 A | 11/1990 | Kumm | 474/49 |
| 5,076,216 A | 12/1991 | Ro | 123/41.46 |
| 5,139,463 A | 8/1992 | Bytzek et al. | 474/69 |
| 5,156,573 A | 10/1992 | Bytzek et al. | 474/74 |
| 5,289,813 A * | 3/1994 | Adachi et al. | 192/48.2 |
| 5,517,957 A | 5/1996 | Wagner et al. | 123/192.1 |
| 5,700,212 A | 12/1997 | Meckstroth | 474/70 |
| 5,827,143 A | 10/1998 | Monahan et al. | 474/73 |
| 5,909,075 A * | 6/1999 | Heimark | 310/103 |
| 5,944,156 A * | 8/1999 | Hatakeyama | 464/81 |
| 6,044,943 A | 4/2000 | Bytzek et al. | 192/41 |
| 6,048,288 A | 4/2000 | Tsujii et al. | 477/5 |
| 6,079,385 A | 6/2000 | Wicke | 123/198 |
| 6,083,130 A | 7/2000 | Mevissen et al. | 474/70 |
| 6,273,230 B1 * | 8/2001 | Nakano et al. | 192/84.961 |
| 6,331,743 B1 * | 12/2001 | Link | 310/103 |
| D459,198 S | 6/2002 | Hodjat | D8/360 |
| 6,494,799 B1 * | 12/2002 | Ochiai | 474/94 |
| 6,582,333 B2 * | 6/2003 | Man et al. | 192/48.92 |
| 6,609,992 B2 * | 8/2003 | Kusumoto et al. | 475/318 |
| 6,893,368 B2 * | 5/2005 | Fujiwara et al. | 474/70 |
| 2005/0061600 A1 * | 3/2005 | Holland | 192/48.92 |

FOREIGN PATENT DOCUMENTS

| | | | |
|---|---|---|---|
| JP | 59047528 A * | 3/1984 | |
| JP | 01 170723 A | 5/1989 | |
| JP | 04151051 A * | 5/1992 | |
| JP | 05 086881 A | 6/1993 | |
| JP | 08261006 A * | 10/1996 | |
| JP | 10030450 A * | 2/1998 | |
| JP | 11280873 A * | 10/1999 | |
| JP | 2003106076 A * | 4/2003 | |
| JP | 2004011792 A * | 1/2004 | |
| WO | WO 9731198 A1 * | 8/1997 | |
| WO | WO 2005/103527 A1 | 3/2005 | |

* cited by examiner

DUAL RATIO BELT DRIVE SYSTEM

FIELD OF THE INVENTION

The invention relates to a dual ratio belt drive system for driving vehicle engine accessories at a first speed ratio and at a second speed ratio.

BACKGROUND OF THE INVENTION

Vehicle engines generally comprise accessories that are used in the operation of the engine and vehicle. Such accessories can include a power steering pump, an air conditioning compressor, an alternator, an oil pump, a fuel pump and so on. These accessories are generally driven by a serpentine belt. The serpentine belt engages a pulley on each accessory as well as on an engine crankshaft. The engine crankshaft provides the torque to drive the accessories.

As the belt is driven by the crankshaft it is necessarily subject to engine speed variations during acceleration and deceleration of the vehicle. In other words the operating speed of the accessories is directly proportional to the speed of the engine.

The variations in engine speed, particularly engine speeds greater than idle, result in inefficient operation of the accessories because each accessory must be designed to operate satisfactorily over the entire engine speed range. This necessarily means that the efficiency is less than optimum for most of the engine speed range. Further, at higher engine speeds greater power is required to drive the accessories, resulting in reduced fuel efficiency and reduced available torque. Therefore it is desirable to decouple some or all of the accessories from the engine crankshaft so they can be driven at a lower and narrower optimum speed range.

Representative of the art is U.S. Pat. No. 5,700,121 (1997) to Meckstroth which discloses a system for powering various rotating vehicle accessories.

The prior art requires the accessories to be disengaged from the engine at engine start for the purpose of "helping" a minimally sized starter. Further, the prior art does not teach a clutch unit combined with a crankshaft damper for reducing application of engine vibration.

What is needed is a dual ratio belt drive system having a clutch unit with an electromagnetic clutch that is engaged at engine start. What is needed is a dual ratio belt drive system further comprising a clutch unit having a crankshaft damper. The present invention meets these needs.

SUMMARY OF THE INVENTION

The primary aspect of the invention is to provide a dual ratio speed belt drive system having a clutch unit with an electromagnetic clutch that is engaged at engine start.

Another aspect of the invention is to provide a dual ratio belt drive system further comprising a clutch unit having a crankshaft damper.

Other aspects of the invention will be pointed out or made obvious by the following description of the invention and the accompanying drawings.

The invention comprises a dual ratio belt drive system for powering rotating accessories. The system comprises a clutch unit rotatably connected to a rotating shaft and an overrunning clutch mounted directly to the rotating shaft. The system also comprises a plurality of rotating accessories rotatably connected to said clutch unit and rotatably connected to said rotating shaft through said over-running clutch such that said accessories are driven by said clutch unit at a first speed ratio and driven directly by said rotating shaft at a second speed ratio, with said clutch unit operating at a predetermined value of an engine operating condition thereby defining the transition between said first and second speed ratios, with said clutch unit being engaged at engine start.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
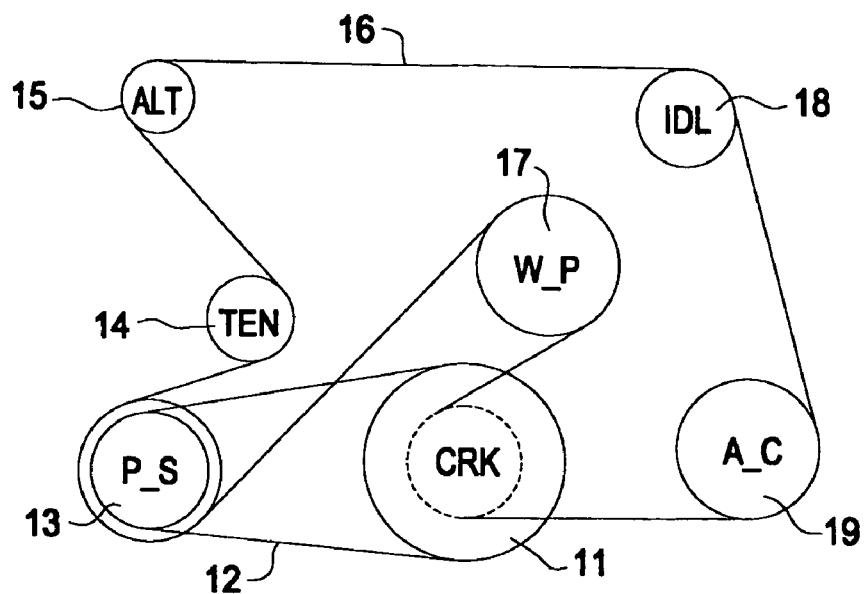
FIG. 1 is a schematic of a dual ratio belt drive system.

A dual ratio belt drive system is shown in FIG. 1. The inventive system operates with a first or second pulley drive ratio which is selected through a clutch unit 11. At a first engine speed a first pulley ratio is used. At a second engine speed a second pulley ratio is used.

The system comprises two belts. The belt used to transmit torque is determined by the state of the clutch unit. The first pulley ratio or second pulley ratio is selected by engaging or disengaging the electromagnetic clutch unit 11. Engaging the clutch unit drives the system with a belt engaged with a first pulley on the clutch unit.

In the first mode (engine speed at approximately idle) the second belt on the system is not transmitting torque directly from the engine crankshaft, but is transmitting torque to the engine accessories from a dual pulley which is also engaged with the first belt.

In a second mode (engine speeds greater than idle) the clutch is disengaged which causes the first pulley and first belt to be decoupled from the system. The accessories are then being driven by the second belt which is engaged with a one-way clutch to the crankshaft. In the second mode the accessories are driven at a relatively slower speed than would be realized with the first belt because the second drive pulley ratio is less than the first drive pulley ratio. This is because the second mode second pulley has a smaller diameter than the first mode first pulley.

The system comprises a clutch unit 11 mounted to a driver rotating shaft such as an engine crankshaft (CRK).

The clutch unit 11 comprises a first and second pulley as well as a crankshaft damper, isolator or both, and electromagnetic clutch. Unit 11 also comprises a one-way clutch.

Clutch unit 11 is drivingly connected to engine accessories water pump W_P (pulley 17), power steering pump P_S (pulley 13), alternator ALT (pulley 15), idler pulley IDL (pulley 18), and air conditioner compressor A_C (pulley 19) by a multiple-ribbed serpentine belt 16. Tensioner TEN (pulley 14) is positioned after the power steering pump dual pulley 13 based on clockwise movement from the crankshaft. Belt 16 is a multiple ribbed belt known in the art.

A second multiple-ribbed belt 12 connects clutch unit 11 with a dual pulley 13 connected to power steering pump P_S. In this embodiment belt 12 is installed on a two point drive. As shown on FIG. 2, belt 16 is physically disposed between the engine and belt 12.

Figure 3:
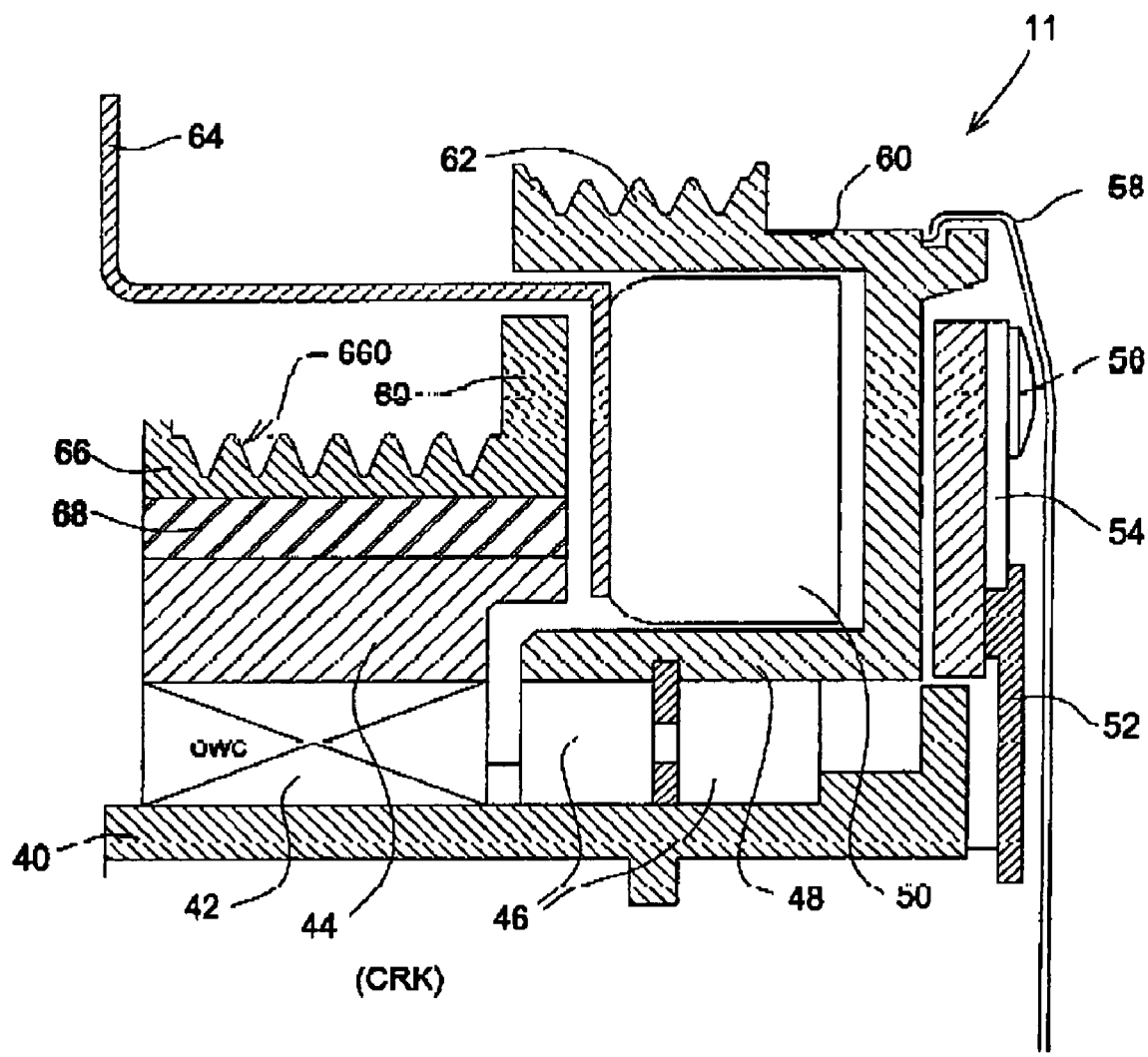
FIG. 3 is a half cross-sectional view of a clutch unit.

Clutch unit 11 as shown in FIG. 3 comprises hub 40 and one-way clutch 42 mounted thereon. FIG. 3 depicts the upper half of a cross-sectional view, the lower half being a mirror image and symmetric with the upper half. In this embodiment hub 40 is directly connected to the engine crankshaft (CRK). Pulley 66 comprises an inner hub 44, a belt bearing outer portion 660, an inertial member 69, and a damping member 68 which is disposed between hub 44 and outer portion 660. Inner hub 44 is engaged with one-way clutch 42. Damping member 68 comprises an elastomeric material known in the crankshaft damper arts. Portion 660 has a multiple-ribbed profile, but may also comprise any profile known in the pulley arts.

Second pulley 62 is connected to rotor 48 of electromagnetic clutch 60. Rotor 48, and thereby pulley 62, are rotationally engaged with hub 40 by bearings 46. Bearings 46 are known in the art comprising ball, sleeve, needle or any another suitable for the service. Coil 50 of electromagnetic clutch 60 is attached to an engine block by a back plate 64.

Hub 40 is connected to electromagnetic clutch plate 56 thru a hub extension 52 and spring plates 54. Clutch unit 11 is covered by cover 58 which prevents dust and debris from entering the unit. Clutch plate 56 is engaged with rotor 48 depending on the energization state of coil 50. Coil 50 is connected to an engine electrical system. One can see the compact size of the clutch since coil 50 is contained within a width of pulley 62.

Figure 2:
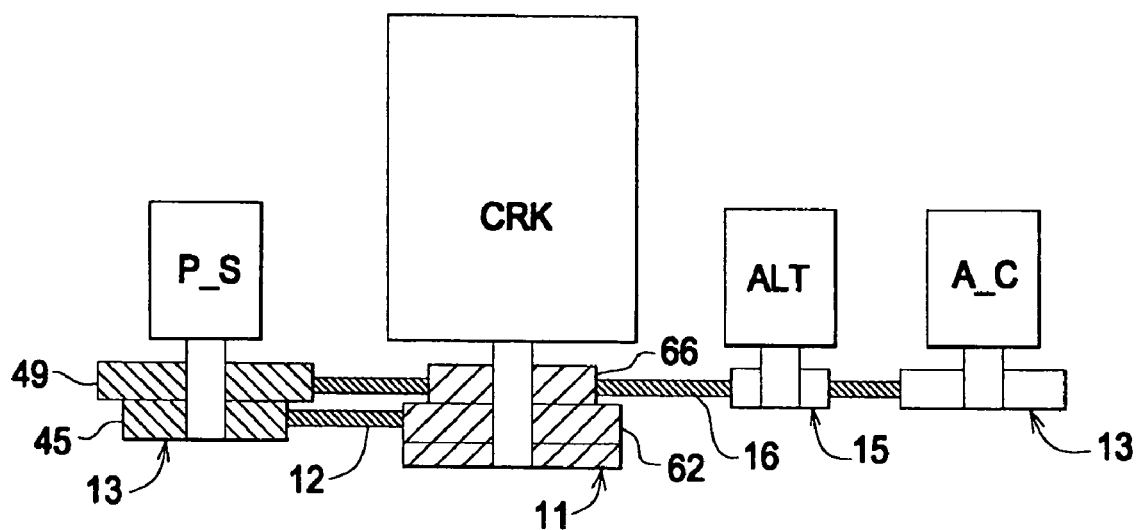
FIG. 2 is a plan view schematic of a dual ratio belt drive system.
Figure 4:
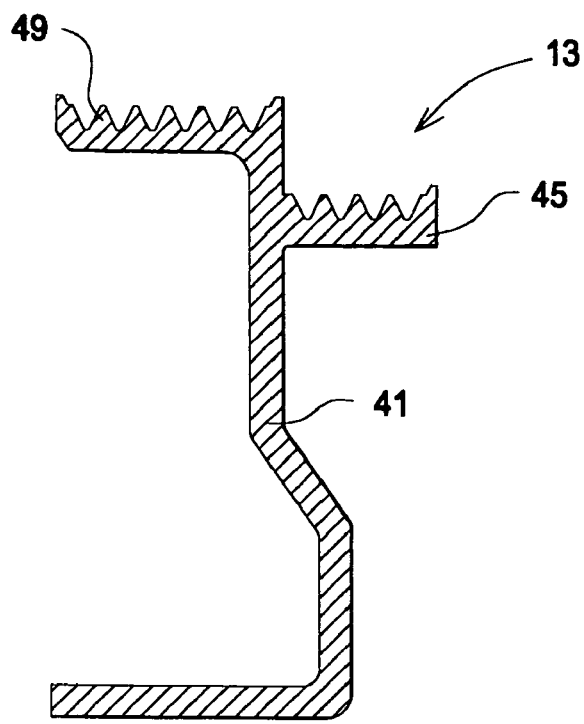
FIG. 4 is a half cross-sectional view of a dual pulley.

Referring to FIG. 2, pulley 66 of clutch unit 11 is connected to a first pulley 49 of the dual pulley 13 on power steering pump with belt 16. FIG. 4 is a cross sectional view of the dual pulley 13. FIG. 4 depicts the upper half of a cross-sectional view, the lower half being a mirror image and symmetric with the upper half. Dual pulley 13 comprises pulley 45 and pulley 49, each connected by web 41. Pulley 62 of clutch unit 11 is connected to pulley 45 of the dual pulley 13 with belt 12.

The inventive system in each of the following embodiments operates in two modes. Mode one is for relatively low engine speeds including idle. Mode two is for all other operating speeds, namely, above idle.

In mode one coil 50 of electromagnetic clutch 60 is energized and therefore the clutch is locked at engine start to allow start of the accessories along with the engine with belt 12. This method avoids the problem of a dip in engine speed if the accessories were brought up to speed after engine start as the clutch is engaged. In mode one pulley 62 and hub 40 rotate together because electromagnetic plate 56 is engaged with clutch 60, thereby rotationally locking pulley 62 to hub 40. Plate 56 is directly connected to hub 40 through hub extension 52, and thereby to the crankshaft CRK.

Pulley 62 transmits torque from the crankshaft through belt 12 to pulley 45 mounted on the power steering pump P_S. FIG. 4 is a cross-sectional view of a dual pulley. Pulley 49 rotates with the same speed as pulley 45. Pulley 49 transmits torque to all other accessories through belt 16.

In mode one pulley 66 is driven by belt 16 at a rotational speed faster than the rotational speed of pulley 62, therefore, one-way clutch 42 is disengaged. In mode one all accessories except the power steering pump are driven in series by belts 12 and 16, although no torque is transmitted from pulley 66 to hub 40.

For example, in case of 5.3 L V8 engine, example diameters of inventive system pulleys in mm are as follows:

TABLE 1

| Crankshaft | | Power steering | | | | |
|---|---|---|---|---|---|---|
| First (66) | Second (62) | First (49) | Second (45) | ALT | W_P | A_C |
| 128 | 165 | 163 | 140 | 59 | 150 | 112 |

Dual Ratio Pulley System Pulley Diameters

The crankshaft/power steering pulley ratios in the system in Table 1 are as follows:

165/140=1.17 (Mode One [First] Ratio)

128/163=0.78 (Mode Two [Second] Ratio)

In mode one the accessories rotate with relatively the same speed as they would in the case of a prior art, direct-coupled accessory drive system.

For comparison purposes, exemplary prior art pulley diameters are shown below in mm:

TABLE 2

| Crankshaft | Power steering | ALT | W_P | A_C |
|---|---|---|---|---|
| 193 | 163 | 59 | 150 | 112 |

Prior Art Pulley Diameters

The crankshaft/power steering pulley ratio in the prior art system in Table 2 is as follows:

193/163=1.18

This ratio is substantially the same as the Mode One [First] Ratio as calculated for Table 1 above. This illustrates that the accessory drive ratios are substantially the same between the systems in Table 1 and 2. However, the relative accessory pulley diameters may be different in the inventive system depending on weight, production costs, speed and other system requirements.

A comparison between the crankshaft diameter in Table 2 with the crankshaft pulley (66) diameter in Table 1 is:

193/128=1.5

This illustrates an overall accessory speed reduction afforded by the inventive system over the prior art system at engine speeds above idle.

Pulley 62 may have a prior art system diameter of 193 mm instead of 165 mm. The diameter of pulley 62 can be reduced to 165 mm in the inventive system due to the smaller diameter of pulley 45, namely, 140 mm instead of 163 mm. In mode one the ratio between crankshaft and power steering pump remains the same: 193/163=165/140=1.17.

In mode two electromagnetic clutch 60 is disengaged and clutch 42 is engaged. During the transition from mode one to mode two the clutch may be disengaged over a period of time, for example three seconds, to reduce shock to the belts and system. Coil 50 is electrically connected to an energy source such as a vehicle battery or alternator and is controlled by an engine CPU. The CPU comprises a computer, memory and connecting buswork and wiring. The CPU detects predetermined engine operating conditions and the CPU calculates a predetermined value for engaging or disengaging the clutch unit based on at least one of a plurality of sensed operating conditions, with said sensed conditions comprising accessory load, engine speed, battery charge, throttle position, engine coolant temperature, vehicle gear selection, vehicle speed, manifold absolute pressure, ambient air temperature, air mass flow rate and accelerator position. As a selected operating condition is traversed either by engine acceleration or deceleration, the clutch is energized or de-energized accordingly.

In mode two second pulley 62 is free running with rotor 48 on ball bearings 46, hence no torque is transmitted between hub 40 and pulley 62. No torque is transmitted between pulley 45 and pulley 62 by belt 12. The accessories are driven solely by belt 16 because clutch 42 is disengaged. Clutch 42 causes pulley 66 to be driven by hub 40. The engine transmits torque through pulley 66 to the accessories.

In case of rapid engine deceleration when accessories due to their inertia may transmit torque towards the engine, clutch 42 disengages allowing the accessories to spin down at a rate less than the deceleration rate of the engine. This reduces wear on belt 16.

The diameter of pulley 66 is relatively smaller than the diameter of pulley 62. For example, the diameter of pulley 66 is 128 mm instead of 165 mm. This reduced pulley ratio reduces the relative speed of all driven accessories by a factor of 1.5.

The first embodiment described herein requires minimum axial space for the belt drive system, however, unit 11 does require some extra axial space for electromagnetic clutch 50. This amounts to approximately 20-25 mm.

Figure 4A:
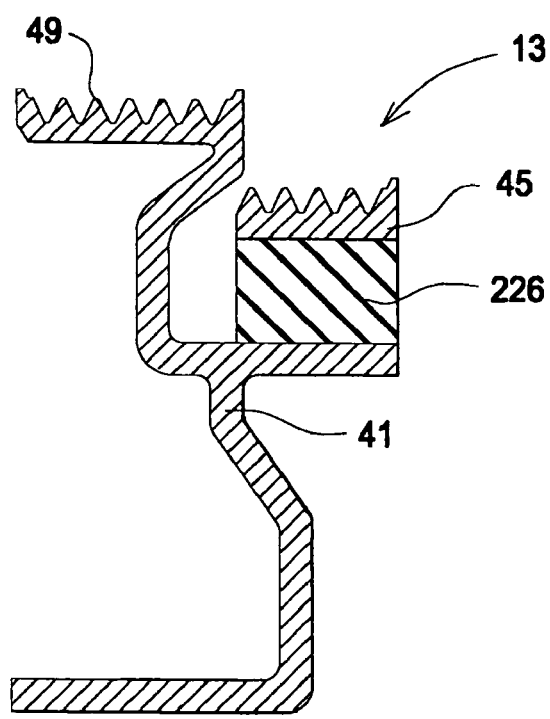
FIG. 4A is a half cross-sectional view of a dual pulley alternate embodiment.

FIG. 4A is a cross-sectional view of a dual pulley alternate embodiment. FIG. 4A depicts the upper half of a cross-sectional view, the lower half being a mirror image and symmetric with the upper half. In this embodiment an elastomeric member 226 is disposed between web 41 and pulley 45. Dual pulley 13 is connected to an accessory, in this case the power steering pump P_S. Elastomeric member 226 acts as a vibration isolator to reduce the amplitude of engine vibrations that would otherwise be transmitted to the accessory through belt 12 from the crankshaft. The isolator primarily functions at engine idle since at speeds greater than idle clutch 11 disconnects pulley 45 from receiving torque from the crankshaft. The elastomeric member may comprise any natural or synthetic rubber or a combination of natural and synthetic rubbers, all known in the art.

Figure 5:
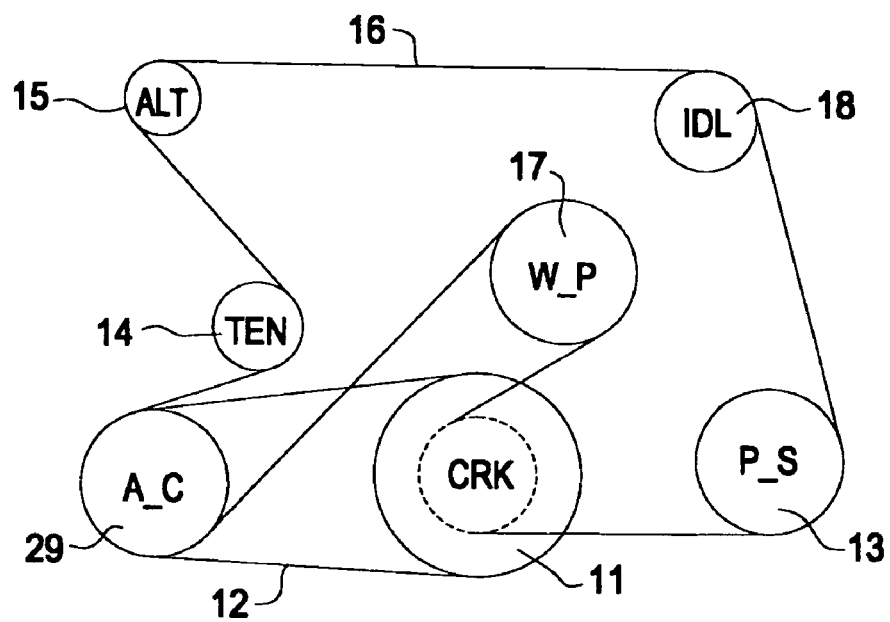
FIG. 5 is a schematic view of a first alternate embodiment of the dual ratio belt drive system.
Figure 6:
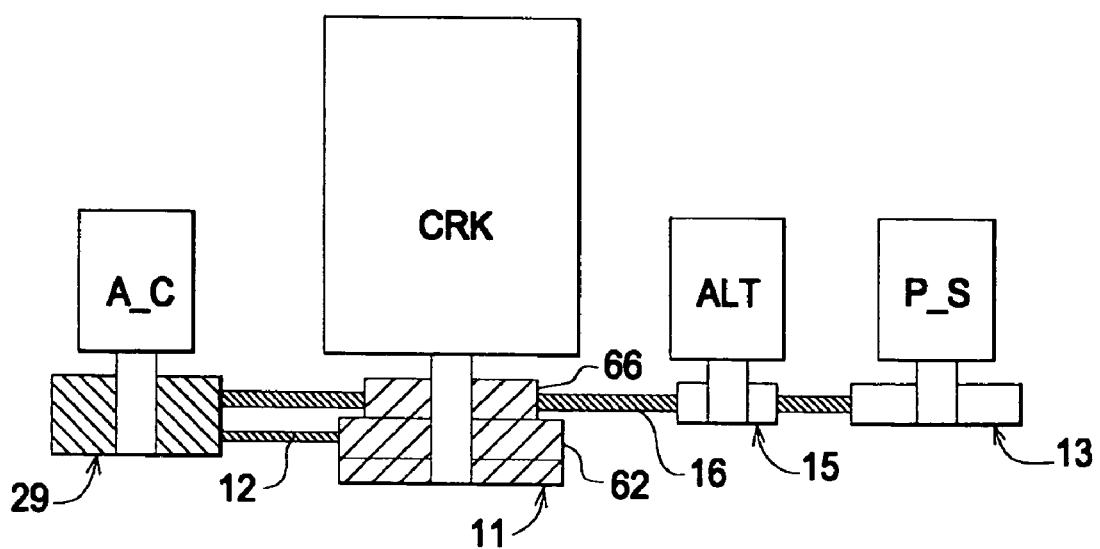
FIG. 6 is a plan view schematic of a first alternate embodiment of the dual ratio belt drive system.

FIGS. 5 and 6 show a first alternate embodiment where clutch unit 11 drive comprises a dual pulley assembly 29 connected to the air conditioning compressor.

In this case the diameter for each pulley is as follows:

TABLE 3

| Crankshaft | | A_C | | | | |
|---|---|---|---|---|---|---|
| First (66) | Second (62) | First | Second | ALT | W_P | P_S |
| 128 | 193 | 112 | 112 | 59 | 150 | 163 |

Dual Ratio Pulley System Pulley Diameters

The crankshaft/A_C pulley ratios in the system in Table 3 are as follows:
193/112=1.72 (Mode One [First] Ratio)
128/112=1.14 (Mode Two [Second] Ratio)

The operation of the system is the same as described for the embodiment in FIGS. 1 and 2. An advantage of mounting the dual pulley on the air conditioning compressor is to utilize space available because the electromagnetic clutch is usually integrated into the air conditioner compressor pulley.

An operational concern is belt replacement. However, considering that belt 12 is used 5-10% of the time and that belt 16 is used all of the time, replacement will most likely be needed more often for belt 16 which is the most inwardly disposed belt with respect to the engine. In the disclosed embodiments, both belts will have to be removed even though replacement of only one may be required.

To address these concerns yet another embodiment is described.

Figure 7:
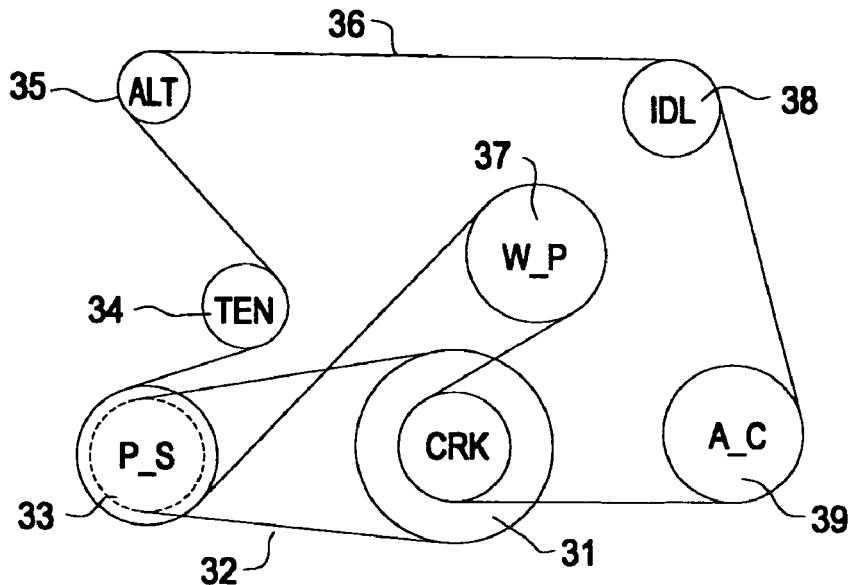
FIG. 7 is a schematic view of a second alternate embodiment of the dual ratio belt drive system.
Figure 8:
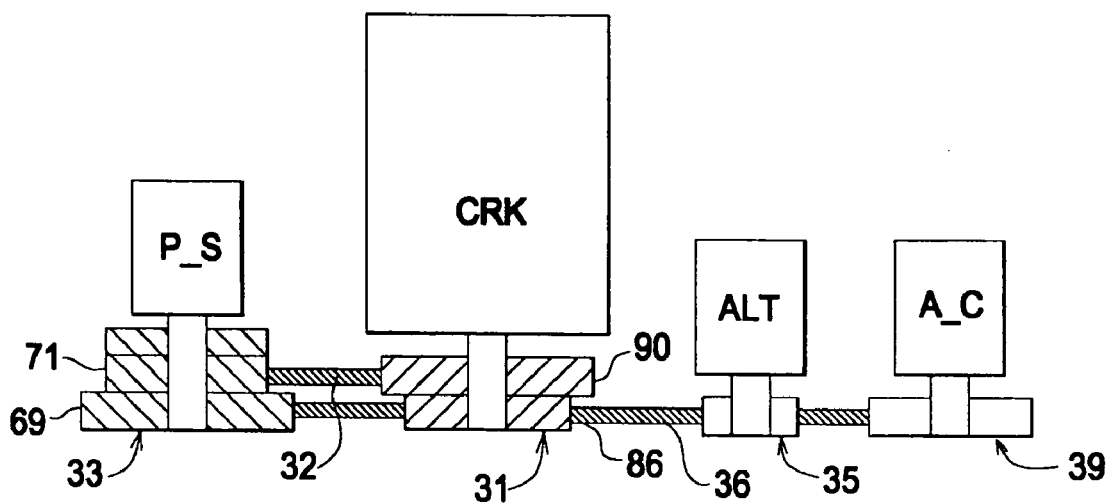
FIG. 8 is a plan view schematic of a second alternate embodiment of the dual ratio belt drive system.

FIGS. 7 and 8 show a second alternate embodiment. The two point drive belt 32 is disposed relatively closer to the engine than the serpentine belt 36. Belt 36 is placed away from the engine outward from belt 32.

Even though the concept and function of all the elements of this embodiment is similar to the foregoing embodiments, the design and placement of the components are somewhat different. The primary difference in this second alternate embodiment is electromagnetic clutch unit 33 is mounted on the power steering unit P_S, see FIG. 9, instead of on the crankshaft. In this embodiment, dual pulley unit 31 is mounted to the crankshaft, see FIG. 10.

Figure 9:
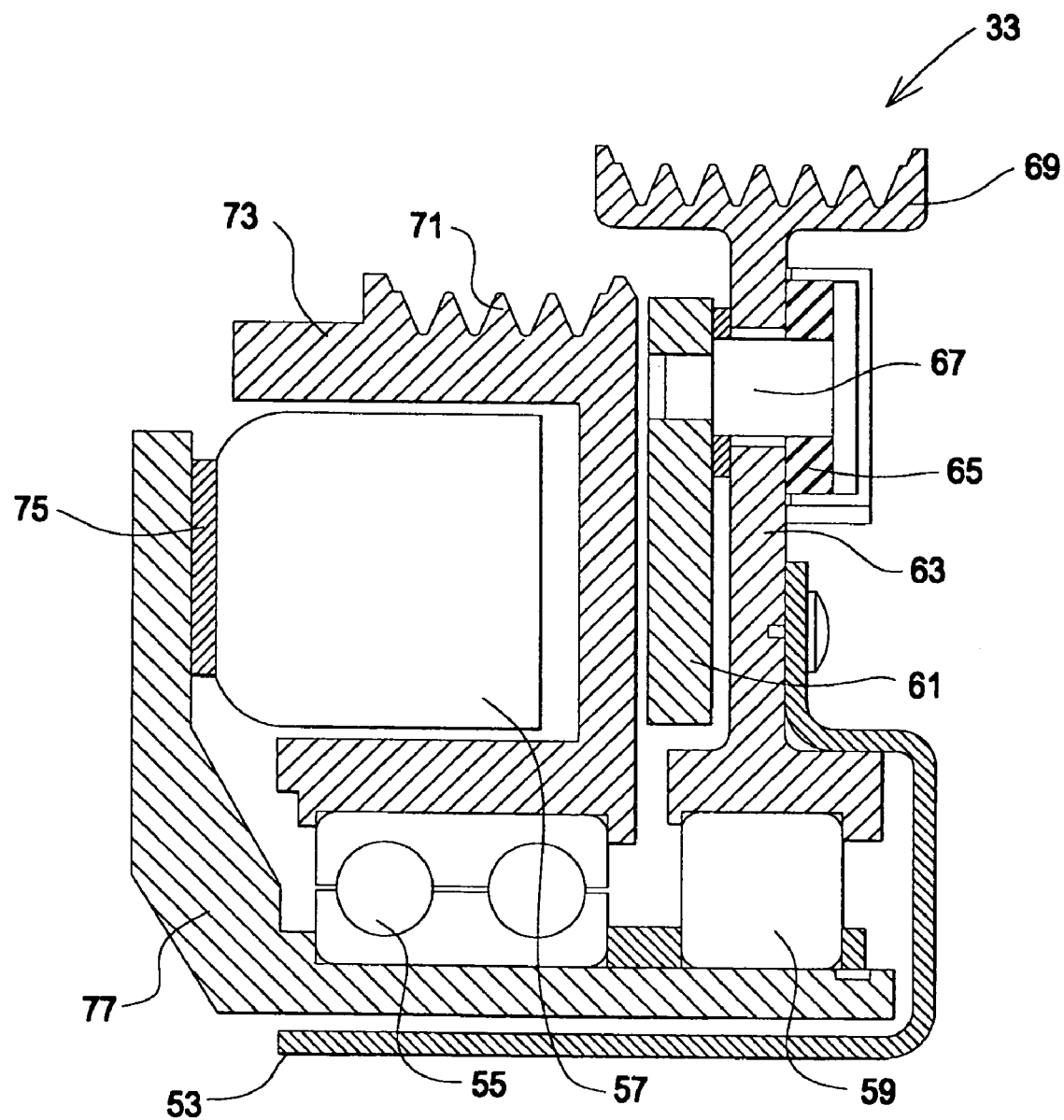
FIG. 9 is a half cross-sectional view of a second alternate embodiment of the clutch unit of the dual ratio belt drive system.

Referring again to FIG. 9, clutch unit 33 comprises an electromagnetic clutch with coil 57. FIG. 9 depicts the upper half of a cross-sectional view, the lower half being a mirror image and symmetric with the upper half. Coil 57 is attached to a stationary housing 77 thru back plate 75. Housing 77 does not rotate and is used to mount the clutch to a surface, for example, an engine surface. Rotor 73 with pulley 71 is rotatably installed on ball bearing 55 on housing 77. Bearing 55 comprises a ball bearing but may also comprise any suitable bearing known in the art. Clutch plate 61 is moveably attached to second pulley 69 with shafts 67, for example, three shafts 67 symmetrically spaced about pulley 69. Rubber pads 65 bias plate 61 away from rotor 73 when coil 57 is not energized. This method of attachment allows plate 61 to move axially from pulley 69 towards rotor 73 when the coil 57 is energized and the clutch is thereby engaged. Pulley 69 also comprises hub 53 by which pulley 69 is directly connected to an accessory, such as a power steering pump shaft. One can see the compact size of the clutch since coil 57 is contained within a width of pulley 71 and plate 61 is contained within a width of pulley 69.

Referring again to FIG. 8, in this second alternate embodiment, in mode one the electromagnetic clutch 57 is engaged. Plate 61 has a frictional engagement with rotor 73, thereby causing pulley 71 and 69 to rotate in unison. Pulley 90 being rigidly connected to the crankshaft transmits torque to pulley 71. Belt 32 is under load. Pulley 69 is transmitting torque to all accessories including pulley 86, however, one-way clutch 82 is disengaged so no torque is transmitted from pulley 86 to hub 80. In this mode one-way clutch 82 is disengaged. All torque is being transmitted from pulley 90 through belt 32.

In mode two, when coil 57 is not energized, pulley 71 rotates freely and does riot transmit torque since belt 32 is decoupled from the system. Clutch 82 is engaged and transmits torque to the accessories. Pulley 69 transmits torque since it is connected to hub 53, which is directly connected to an accessory shaft.

The diameters of all pulleys in mm described above are as follows:

TABLE 4

| Crankshaft | | Power steering | | | | |
|---|---|---|---|---|---|---|
| First (86) | Second (90) | First (69) | Second (71) | ALT | W_P | A_C |
| 128 | 165 | 163 | 140 | 59 | 150 | 112 |

Dual Ratio Pulley System Pulley Diameters

The crankshaft/power steering pulley ratios in the system in Table 4 are as follows:

165/140=1.18 (Mode One [First] Ratio)
128/163=0.78 (Mode Two [Second] Ratio)

The diameter of first pulley 86 is determined in the same manner as described above in the first embodiment. The speed of all accessories in this mode is approximately 1.5 times slower than a direct coupled prior art system.

In this embodiment the axial space required by the electromagnetic clutch 33 is allocated between the power steering pump and its dual pulley assembly. To accommodate this extra length is may be necessary for the power steering pump to be moved along the engine longitudinal axis towards engine flywheel.

The components in all disclosed embodiments are components known in the art. For example, the one-way clutches may be obtained from Formsprag. Electromagnetic clutches can be obtained from Ogura. For example, FIGS. 3 and 9 show standard clutches, type 6 557162, torque capacity 128 N-m (FIG. 3) and type 10 515376, torque capacity 120 N-m.

Figure 9A:
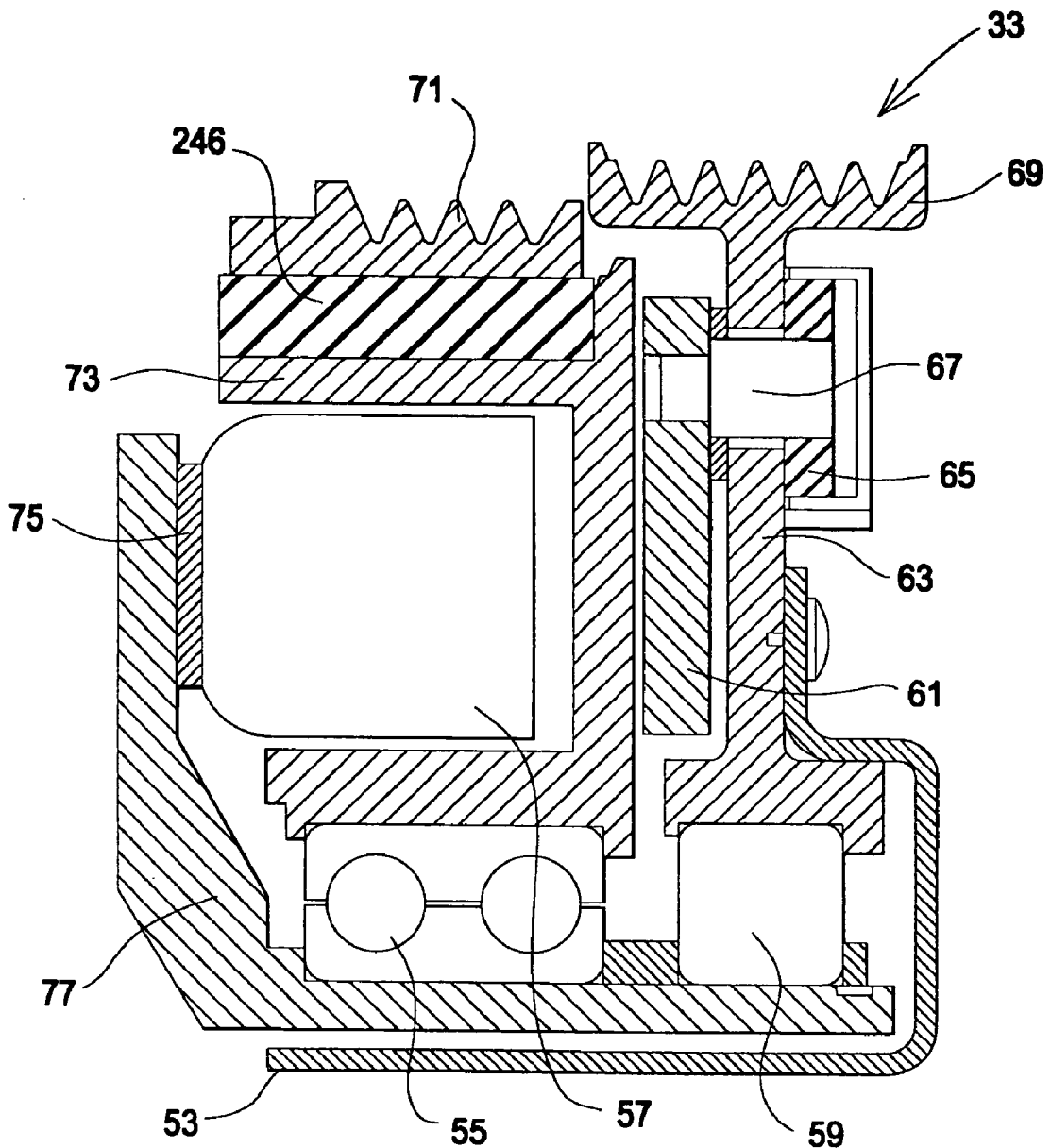
FIG. 9A is an alternate embodiment of the clutch unit in FIG. 9.

FIG. 9A is an alternate embodiment of the clutch unit in FIG. 9. FIG. 9A depicts the upper half of a cross-sectional view, the lower half being a mirror image and symmetric with the upper half. In this embodiment elastomeric member 246 is disposed between pulley 71 and rotor 73. Elastomeric member 246 comprises a damper when unit 33 is connected directly to the crankshaft. In this embodiment member 246 comprises a vibration isolator when the clutch unit 33 is directly connected to an accessory shaft as shown in FIG. 8. Elastomeric member 246 may comprise any natural or synthetic rubber or a combination of natural and synthetic rubbers, all known in the art.

Figure 10:
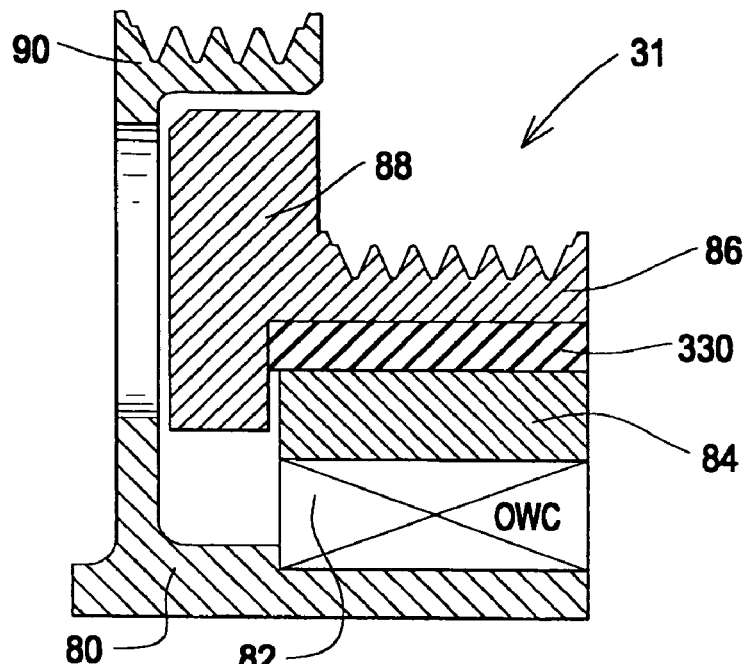
FIG. 10 is a half cross-sectional view of a dual pulley for the second alternate embodiment of the clutch unit of the dual ratio belt drive system.

FIG. 10 is a cross-sectional view of the dual pulley for the second alternate embodiment of the clutch unit of the dual ratio belt drive system. FIG. 10 depicts the upper half of a cross-sectional view, the lower half being a mirror image and symmetric with the upper half. Dual pulley 31 is shown in a system in FIG. 8. Pulley 90 is connected to hub 80. Pulley 86 is rotatably engaged to hub 80 through one-way clutch 82. Elastomeric damping member 330 is disposed between pulley 86 and rotor 84. Member 330 damps crankshaft torsional vibrations. The elastomeric damping member may comprise any natural or synthetic rubber or a combination of natural and synthetic rubbers, all known in the art. Rotor 84 is engaged with one-way clutch 82. Pulley 86 further comprises inertial member 88 which helps to reduce speed and torsional transients caused by engine firing. Is also takes advantage of the inertia of the accessories when clutch 82 is being overridden. Inertial member 88 comprises a mass which size is selected in accordance with the vibrational and inertial characteristics of the engine crankshaft and the damping requirements of the system.

Figure 10A:
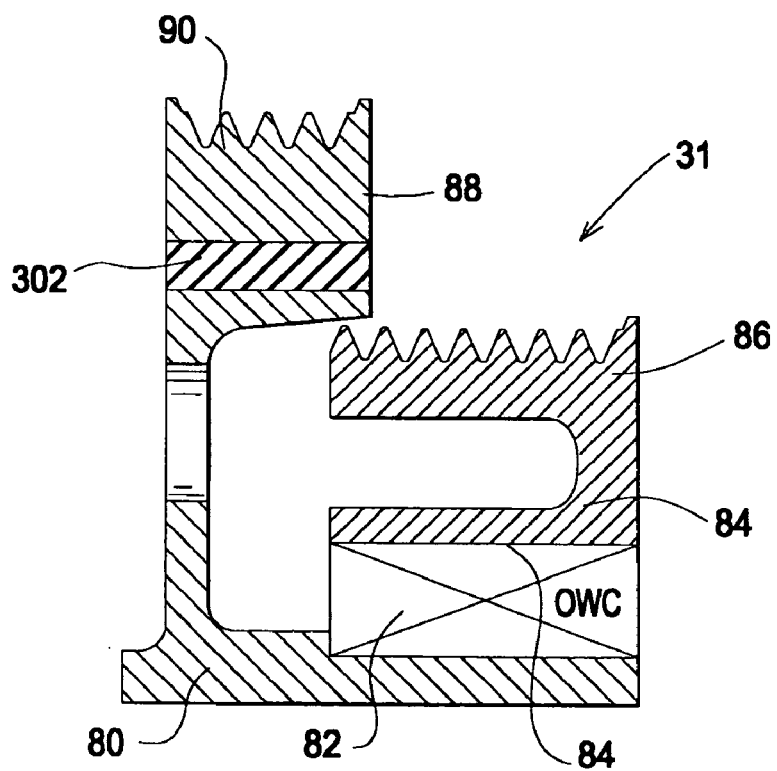
FIG. 10A is a half cross-sectional view of an alternate embodiment of the dual pulley in FIG. 10.

FIG. 10A is a cross-sectional view of an alternate embodiment of the dual pulley in FIG. 10. FIG. 10A depicts the upper half of a cross-sectional view, the lower half being a mirror image and symmetric with the upper half. In this embodiment an elastomeric damping member 302 is disposed between pulley 90 and hub 80. In this embodiment dual pulley 31 is connected to the engine crankshaft. Member 302 acts as a damper to isolate crankshaft vibrations otherwise being transmitted through belt 16 to an accessory. The contribution of damper 302 is greatest at speeds above engine idle where damper 302 absorbs inertial loads and not torque loads since the clutch 60 is disengaged at engine speeds greater than idle. The elastomeric member may comprise any natural or synthetic rubber or a combination of natural and synthetic rubbers, all known in the art.

In any of the foregoing embodiments either belt 12 or belt 16 or both may comprise a low modulus belt known in the art. The low modulus belt comprises a belt having a tensile cord comprising nylon 4.6 or nylon 6.6 or a combination of the two. An elastic modulus of the belt is in the range of approximately 1500 N/mm to approximately 3000 N/mm. A feature of the low modulus belt is that it can be installed on a belt drive system without a tensioner or moveable shaft accessory. The low modulus belt is simply installed using a belt installation tool known in the art. The tool is used to roll or laterally urge the belt over an edge of a transmission pulley or accessory pulley without the need to otherwise adjust the center location of the pulley shaft. The low modulus belt is particularly suitable for the two point belt, i.e. belt 12 and 32, since equipping the transmission in such a way that it would otherwise be movable to allow installation and adjustment of belt 12, 32 might be more expensive than simply designing the transmission to be directly connected to an engine mounting surface such as an engine block. Further, adjusting the transmission shaft location with respect to the crankshaft would consume more assembly time as well.

Figure 11:
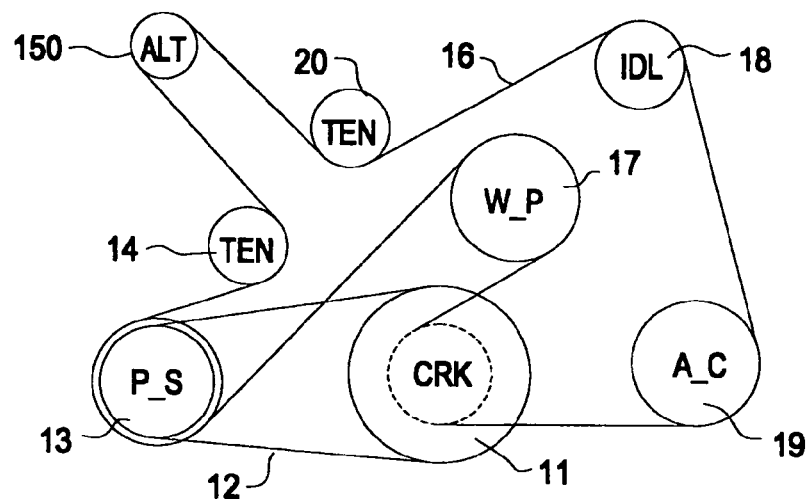
FIG. 11 is a schematic of an alternate arrangement including a motor generator in a dual ration belt drive system.

In an alternate embodiment the inventive system comprises a motor generator in combination with the accessories. FIG. 11 is a schematic of an alternate embodiment including a motor generator. Motor generator M/G is engaged with belt 16 through pulley 150 which is engaged with belt 16. Since motor generator M/G includes a generator, the alternator included in the embodiment shown in FIG. 1 is omitted. Further a tensioner Ten (pulley 20) is included in this alternate embodiment to assure proper belt tension. Tensioner TEN is known in the art. Except as described in FIG. 12, the system shown in FIG. 11 is as described in FIG. 1.

Figure 12:
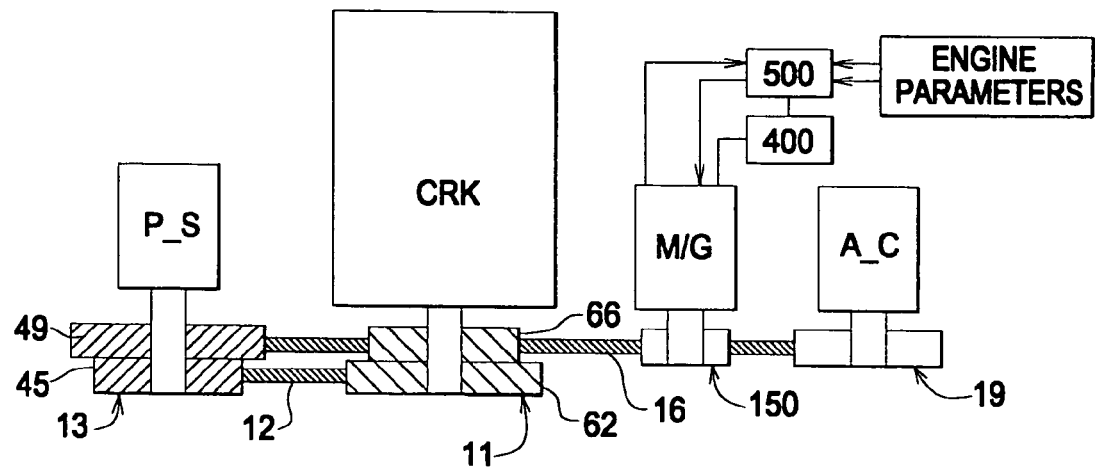
FIG. 12 is a plan view schematic of the alternate embodiment including a motor generator in FIG. 11.

FIG. 12 is a plan view schematic of the alternate embodiment including a motor generator. The alternate system operates in two modes.

Initially, in a first mode motor generator M/G is operated as a motor when the engine is off. When operated as a motor M/G runs the accessories, for example power steering pump (P_S) and air conditioning compressor (A_C), when the engine is OFF. In this mode the M/G is used to start the engine as required. After starting the engine M/G acts in a second mode as a power generator for powering vehicle accessories and for providing electrical energy for charging the battery 800.

When the engine is started from a state where the vehicle is stopped, M/G in motor mode cranks the engine. Clutch 60 is turned ON thereby engaging belt 12 and pulley 62, thereby transmitting torque from the M/G through belt 16 to pulley 13 to belt 12 to pulley 62 and thereby to the crankshaft.

During the engine start process, controller 500 detects the speed of M/G. Controller 500 causes inverter 400 to perform a switching operation such that a torque and speed required to start the engine are realized. For example, if a signal for switching the air conditioner A/C has been turned ON at engine start, a higher torque is required compared with the OFF state of the A/C. Therefore, controller 500 applies to inverter 400 a switching control signal to allow M/G to rotate at a higher torque with a greater speed.

The switching control signal may be determined by a variety of status signals of the engine and the vehicle which are provided to the controller 500 and thereby collated with a map memory stored in the memory. Alternatively, the switching control signal may be determined by calculations performed by the processor unit (CPU) disposed in controller 500.

Once the engine is running, the M/G operates as a generator and the dual ratio pulley operating modes described elsewhere in this specification are realized. Namely, clutch 60 is ON for engine stat and a first operating speed range, approximately idle speed, and clutch 60 is OFF, or disengaged, for a second operating speed range greater than approximately idle speed as described in this specification. The accessories are connected to the clutch unit and to the one-way clutch such that when the engine is operating the accessories are driven by the clutch unit at a first speed ratio and is driven by the one-way clutch at a second speed ratio, the first speed ratio and second speed ratio selected by an engine operating condition.

Use of the M/G in the system allows a dual fuel economy improvement to be realized. In the first instance a fuel economy improvement is realized by operating the accessories at a reduced speed ratio for speeds above idle. In the second instance a fuel economy improvement is realized by operation of the motor generator by allowing engine stop for predetermined vehicle operating situations, such as at a stop light.

More particularly, when the M/G is used as a generator and the engine is operating at approximately idle speed, clutch 60 is turned ON as described for FIG. 1. At engine speeds above idle, clutch 60 is turned OFF and one-way clutch 42 is in an engaged state, thereby transmitting torque from the crankshaft through pulley 66 through belt 16 to the accessories.

When the accessories are operated by the M/G in motor mode while the engine and crankshaft are stopped, clutch 60 is turned OFF. Since clutch 60 is OFF, in effect, this configuration acts as though the clutch unit 11 is in a 'neutral' gear thereby preventing transmission of torque from pulley 150 and belt 12 to the crankshaft. Further, in this mode one-way clutch 42 is in the over-running mode so no torque is transmitted from belt 16 to the crankshaft. Hence the accessories are driven by the M/G without turning the crankshaft. In this case controller 500 applies to inverter 400 a switching control signal to rotate the M/G at the speed and torque corresponding to the loads of the needed accessories. Of course, clutch 60 is also disengaged for engine speeds greater than idle as described for FIGS. 1 and 2.

When an engine stop signal is received controller 500 stops the engine by transmitting a signal for interrupting fuel supply to the engine, for example, to an electric fuel pump (not shown). The engine stop operation can be performed under a condition where, for example, the vehicle speed is zero, the brakes are partially or fully applied, and the shift lever is in the D or N setting. The signal that stops the engine is used to disengage clutch 60, thereby decoupling belt 12 from the crankshaft.

The foregoing descriptions are not intended to limit the applications of the inventive system. In each of the foregoing embodiments the diameter of each pulley in the system can be selected to provide the desired drive ratio.

Although forms of the invention have been described herein, it will be obvious to those skilled in the art that variations may be made in the construction and relation of parts without departing from the spirit and scope of the invention described herein.

I claim:

1. A dual ratio belt drive system comprising;
    a clutch unit directly mounted to a rotating shaft;
    a one-way clutch comprising a damper, the one-way clutch directly mounted to the rotating shaft;
    at least one accessory rotatably connected to the clutch unit and to the one-way clutch through the damper such that the accessory is driven by the clutch unit at a first speed ratio and is driven by the one-way clutch at a second speed ratio;
    the first speed ratio and second speed ratio selected by an engine operating condition; and
    the clutch unit is engaged at engine start.

2. The system as in claim 1, wherein the clutch unit comprises an electromagnetic clutch.

3. The system as in claim 1, wherein the one-way clutch damper further comprises elastomeric material.

4. The system as in claim 1, wherein the first speed ratio is greater than the second speed ratio.

5. A dual ratio belt drive system comprising:
    a clutch unit directly connected to an first rotating shaft;
    a one-way clutch comprising a damper directly connected to a second rotating shaft;
    the first rotating shaft rotatably connected to the one-way clutch through the damper such that the accessory is driven by the clutch unit at a first speed ratio and is driven by the one-way clutch at a second speed ratio;
    the first speed ratio and second speed ratio determined by an engine operating condition; and
    the clutch unit is engaged at engine start.

6. The system as in claim 5, wherein the one-way clutch further comprises a pulley and an inertial member.

7. The system as in claim 5, wherein the one-way clutch comprises a damping member.

8. The system as in claim 7, wherein the damping comprises elastomeric material.

9. The system as in claim 5, wherein the clutch comprises an electromagnetic clutch.

10. The system as in claim 5, wherein the first speed ratio is greater than the second speed ratio.

* * * * *